United States Patent

Kamen et al.

Patent Number: 5,905,500
Date of Patent: May 18, 1999

[54] METHOD AND APPARATUS FOR ADAPTIVE NONLINEAR PROJECTIVE RENDERING

[75] Inventors: Yakov Kamen, Cupertino; Leon Shirman, Redwood City, both of Calif.

[73] Assignee: Seiko Epson Corporation, Tokyo, Japan

[21] Appl. No.: 08/819,312

[22] Filed: Mar. 18, 1997

Related U.S. Application Data

[XX .
[60] Provisional application No. 60/038,111, Feb. 19, 1997.

[51] Int. Cl.$^6$ .................................................. G09B 9/08
[52] U.S. Cl. ........................................... 345/419; 345/418
[58] Field of Search .................................... 345/418, 419, 345/420, 423, 424

[56] References Cited

U.S. PATENT DOCUMENTS

| | | | |
|---|---|---|---|
| 5,097,427 | 3/1992 | Lathrop et al. | 345/430 |
| 5,255,352 | 10/1993 | Falk | 345/425 |
| 5,307,450 | 4/1994 | Grossman | 345/423 |
| 5,369,736 | 11/1994 | Kato et al. | 345/425 |
| 5,469,535 | 11/1995 | Jarvis et al. | 345/430 |
| 5,490,240 | 2/1996 | Foran et al. | 345/430 |
| 5,495,563 | 2/1996 | Winser | 345/430 |
| 5,522,019 | 5/1996 | Bala et al. | 345/424 |
| 5,550,960 | 8/1996 | Shirman et al. | 345/430 |
| 5,594,846 | 1/1997 | Donovan | 345/430 |

FOREIGN PATENT DOCUMENTS

| | | |
|---|---|---|
| 2164681 | 6/1996 | Canada . |
| 0 680 020 | 11/1995 | European Pat. Off. . |
| 0 718 797 | 6/1996 | European Pat. Off. . |

*Primary Examiner*—Cliff N. Vo.
*Attorney, Agent, or Firm*—Michael T. Gabrik

[57] ABSTRACT

In three-dimensional graphics rendering, a method of texture mapping, or shading, applies to triangle-based graphical objects having undergone a perspective transformation. The present invention makes use of linear interpolation for determining the appropriate mapping for the interior points of each triangle, thus reducing the computation-intensive mathematical calculations otherwise required. In order to minimize visual artifacts due to high interpolation errors, the borders of each triangle are tested against a predetermined threshold, and the triangle subdivided if any of the borders contain a maximum error which exceeds the threshold. The subdivision continues until all triangle sides have maximum errors that are less than the threshold value. Linear interpolation is then used to determine all mappings for the sides and interior points of the triangle. In alternative embodiments, the triangle is subdivided without using recursive methods. In one non-recursive method, the entire triangle is subdivided uniformly based on the necessary number of segments into which the triangle sides must be broken to keep the maximum error below the threshold. In another non-recursive method, w-isosceles triangles are subdivided into trapezoids, each of which is then subdivided into w-isosceles, and mostly geometrically isosceles, triangles.

54 Claims, 9 Drawing Sheets

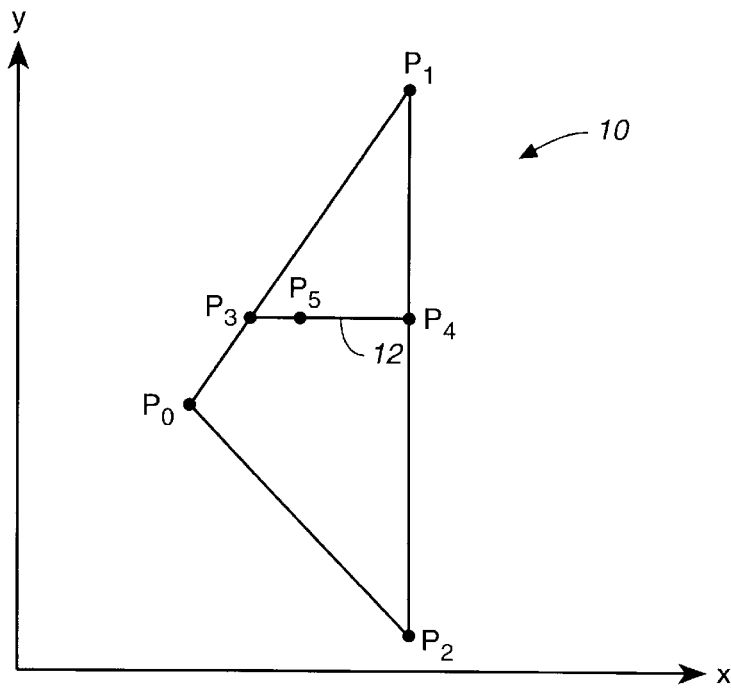
FIG._1
(PRIOR ART)
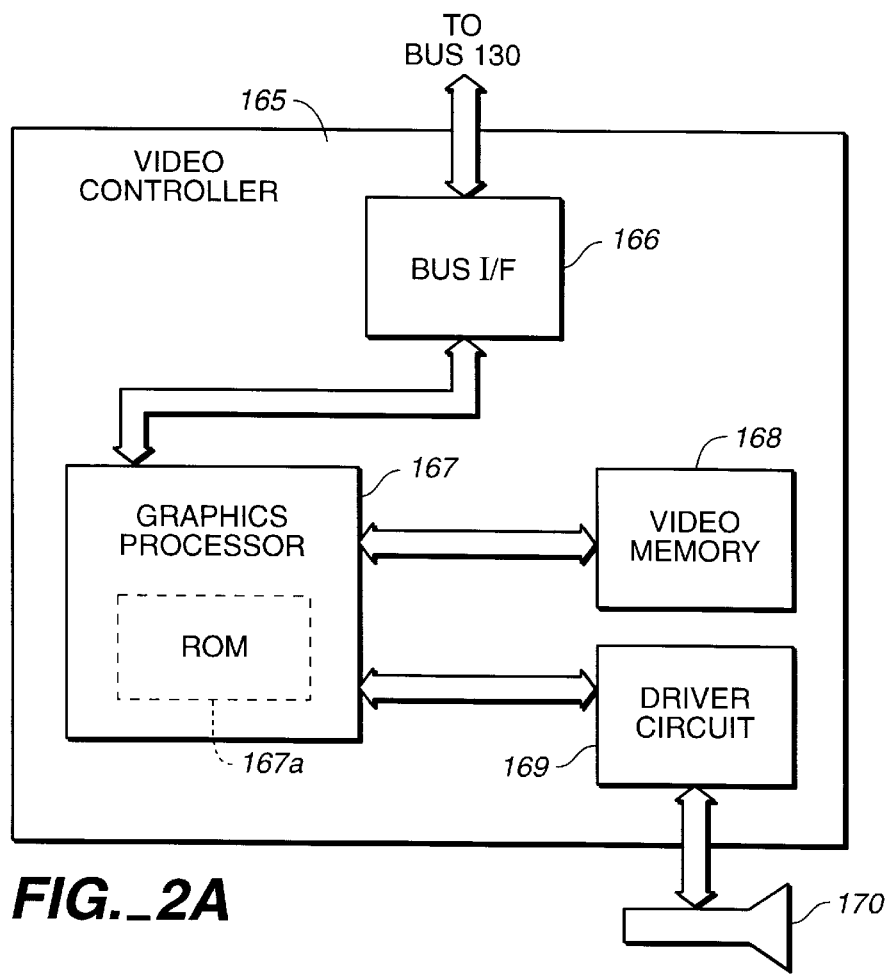
FIG._2A

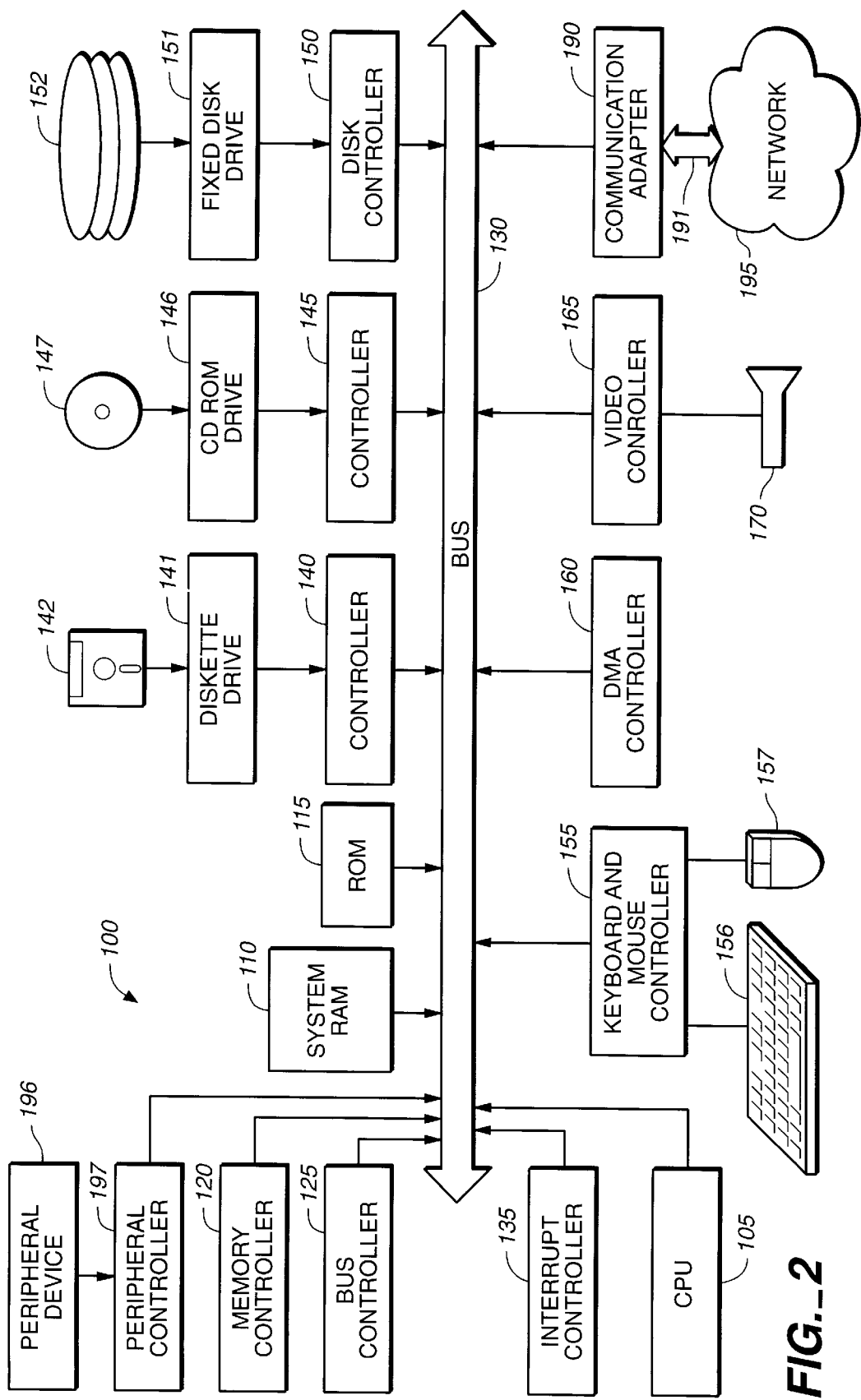
FIG._2

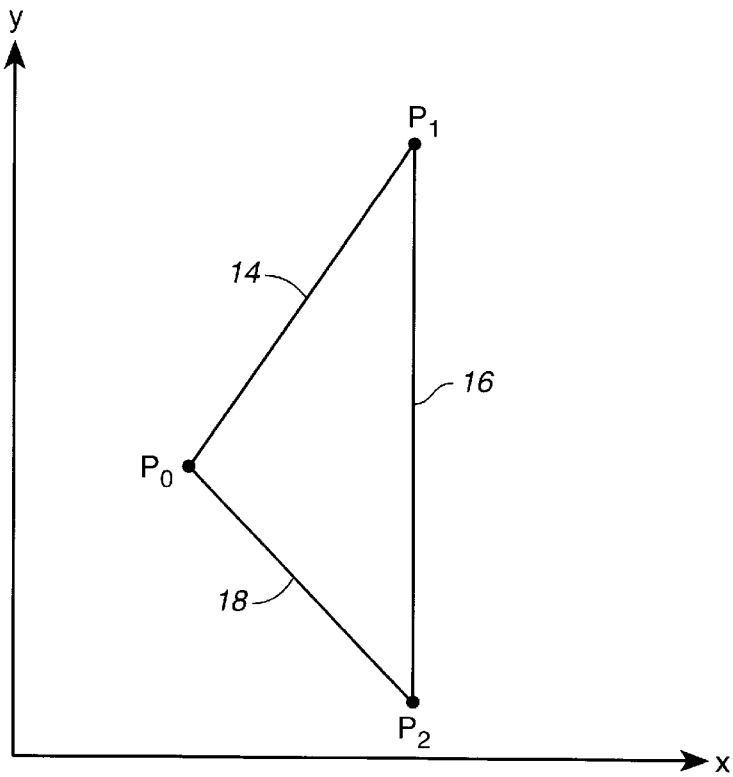
FIG._3A
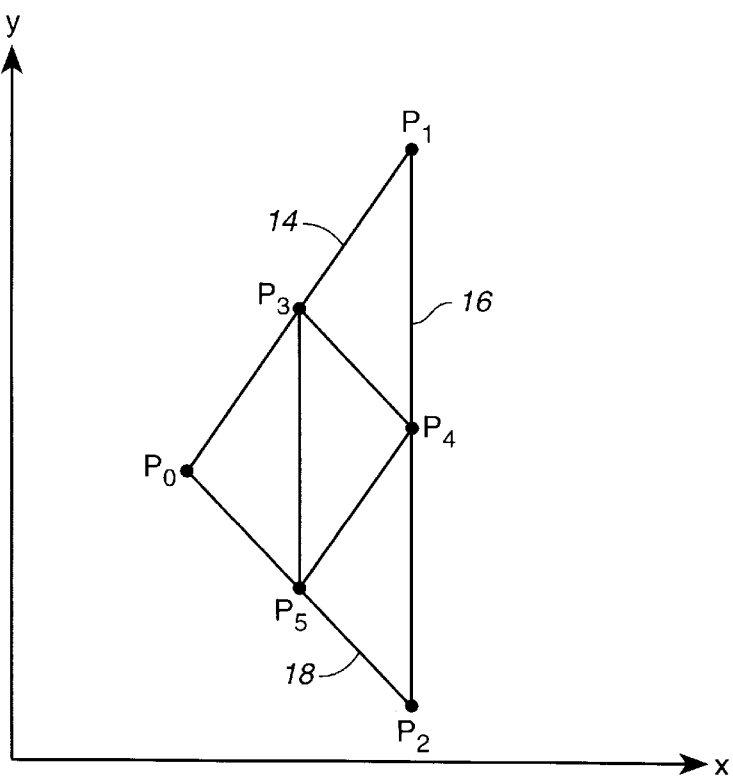
FIG._4

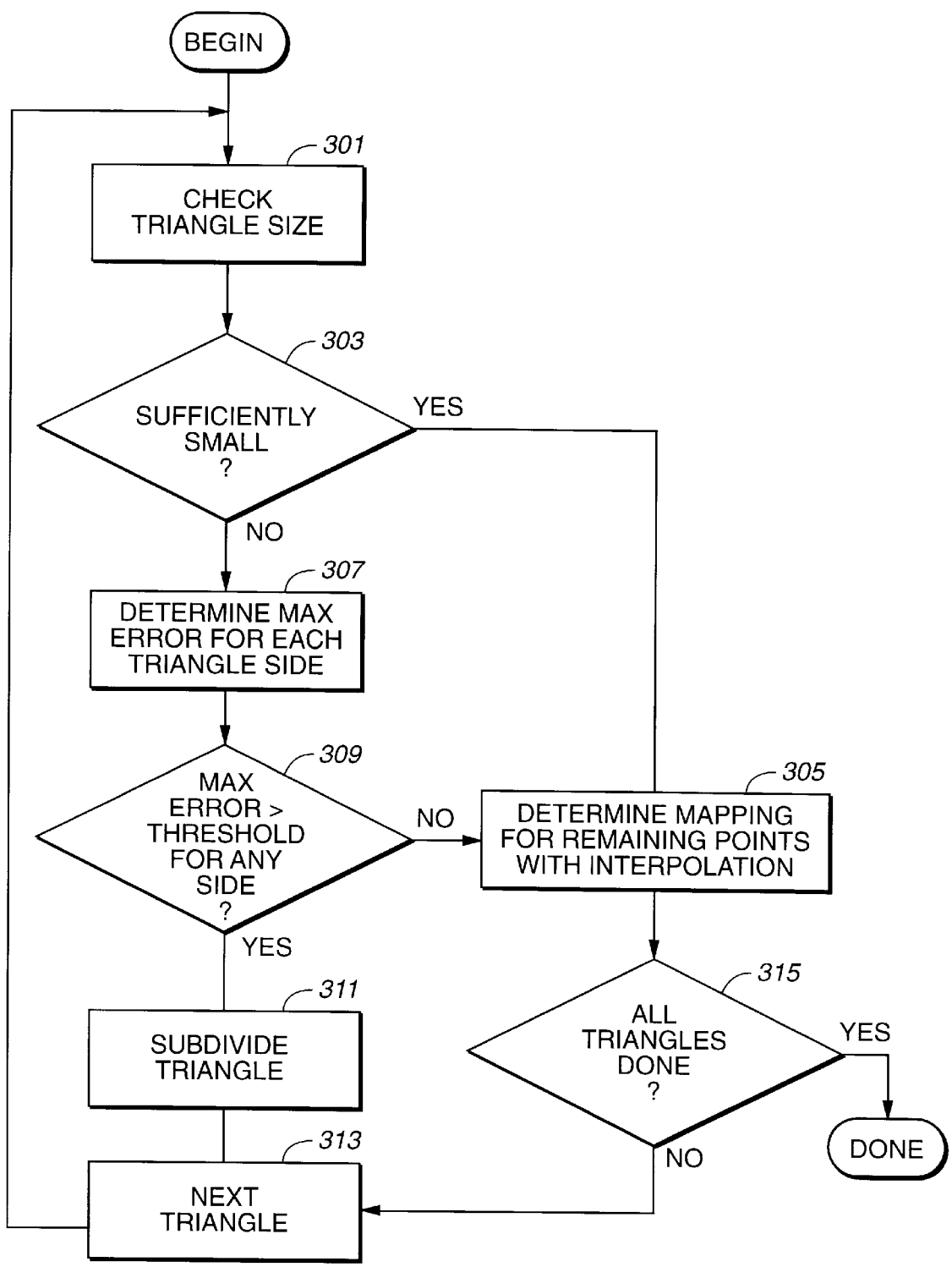
FIG._3B

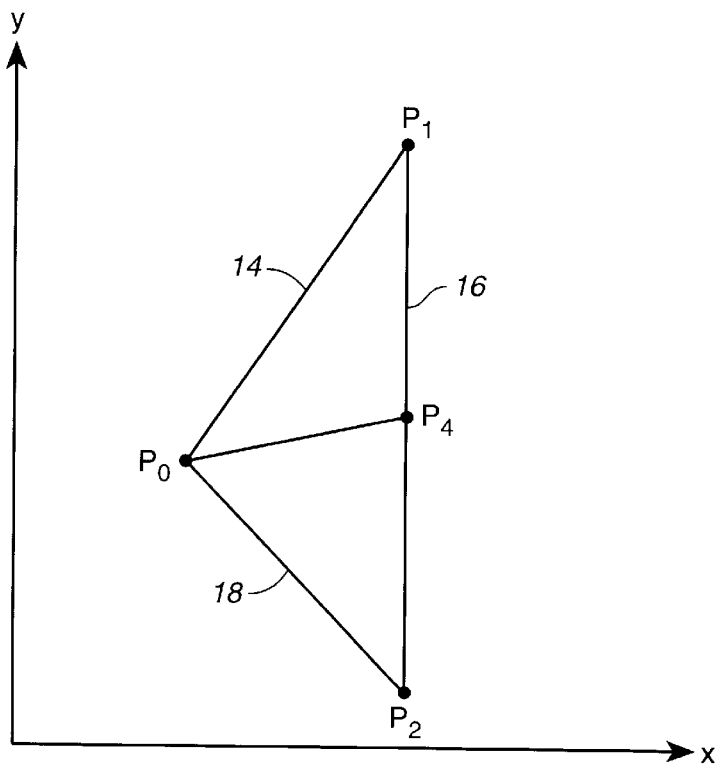
FIG._5
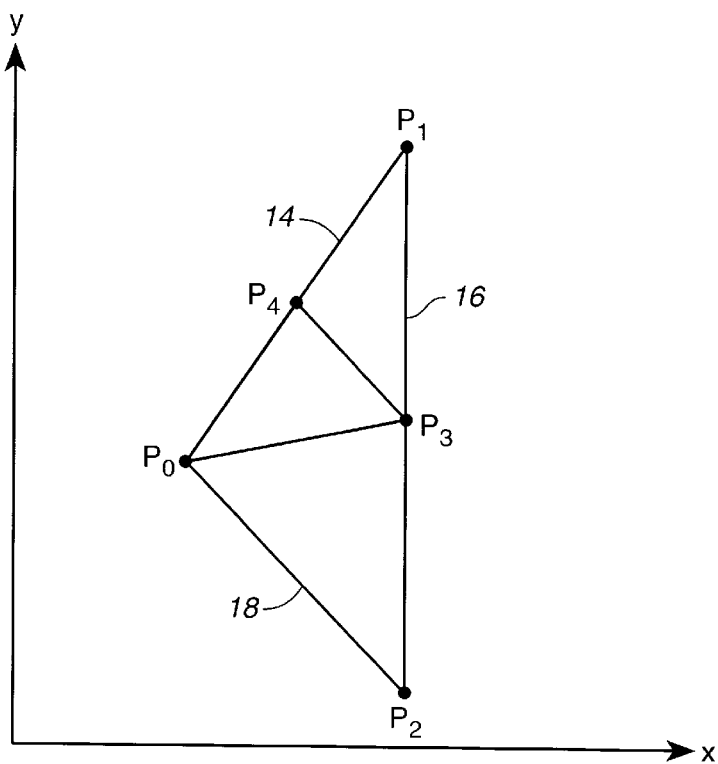
FIG._6

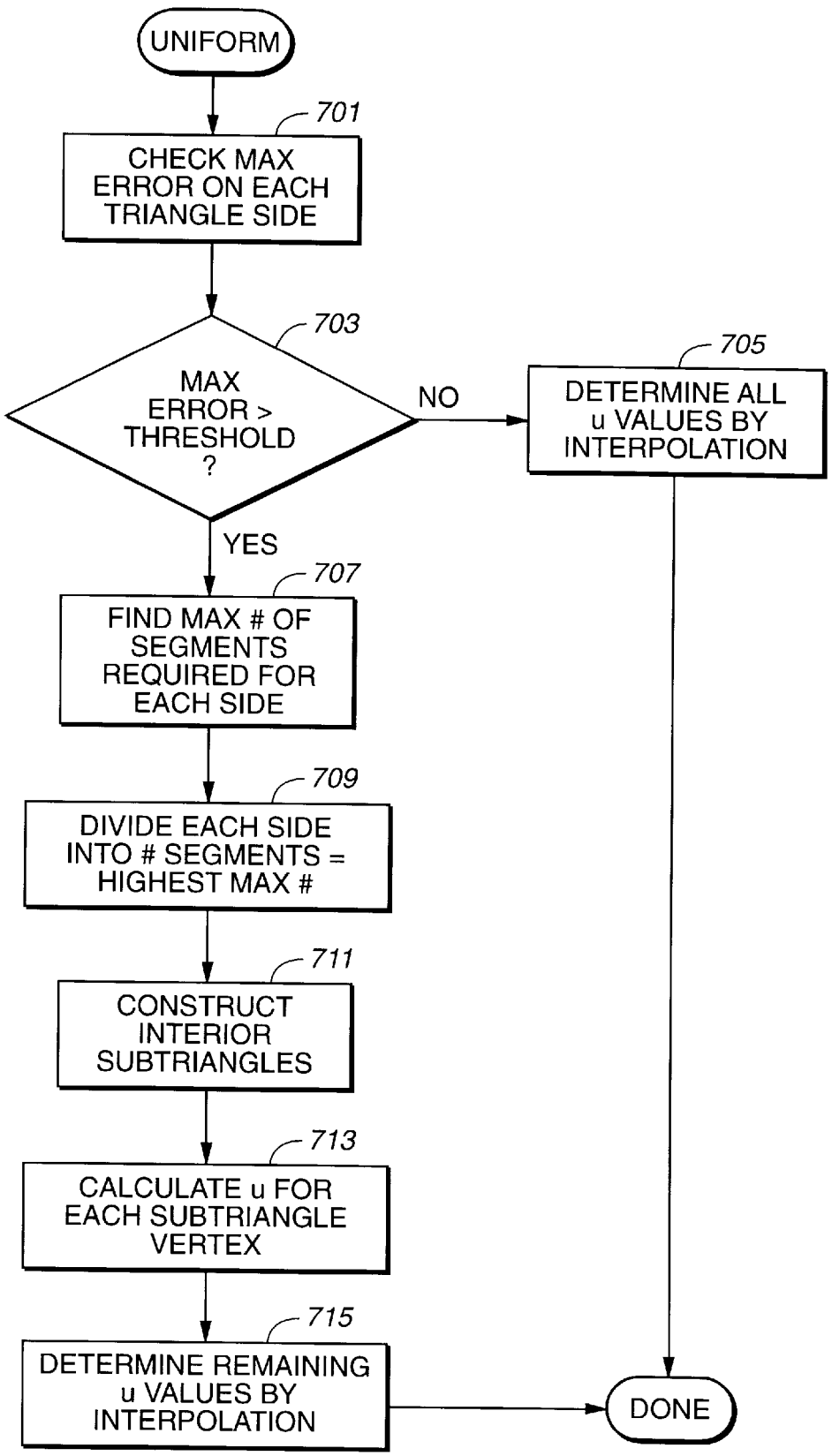
FIG._7

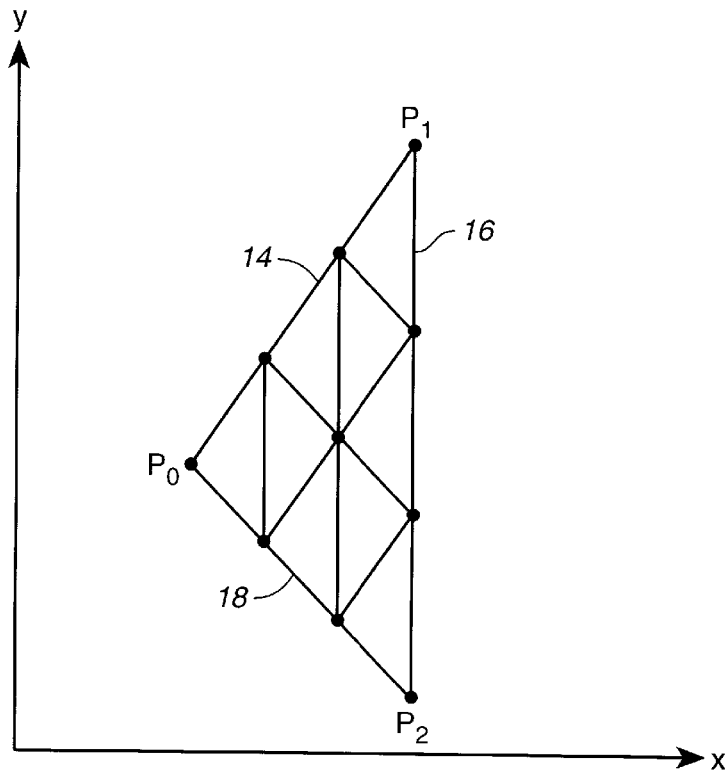
FIG._7A
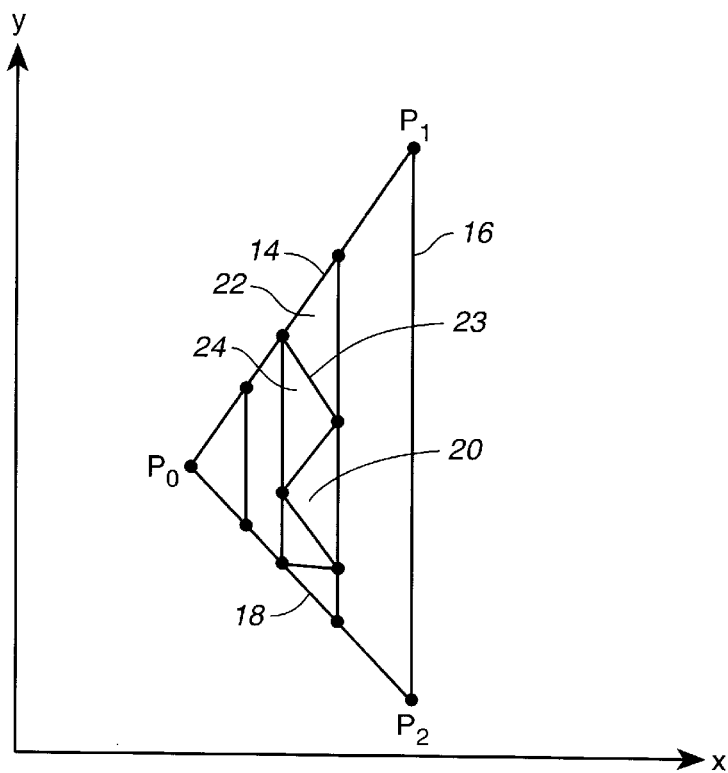
FIG._8B

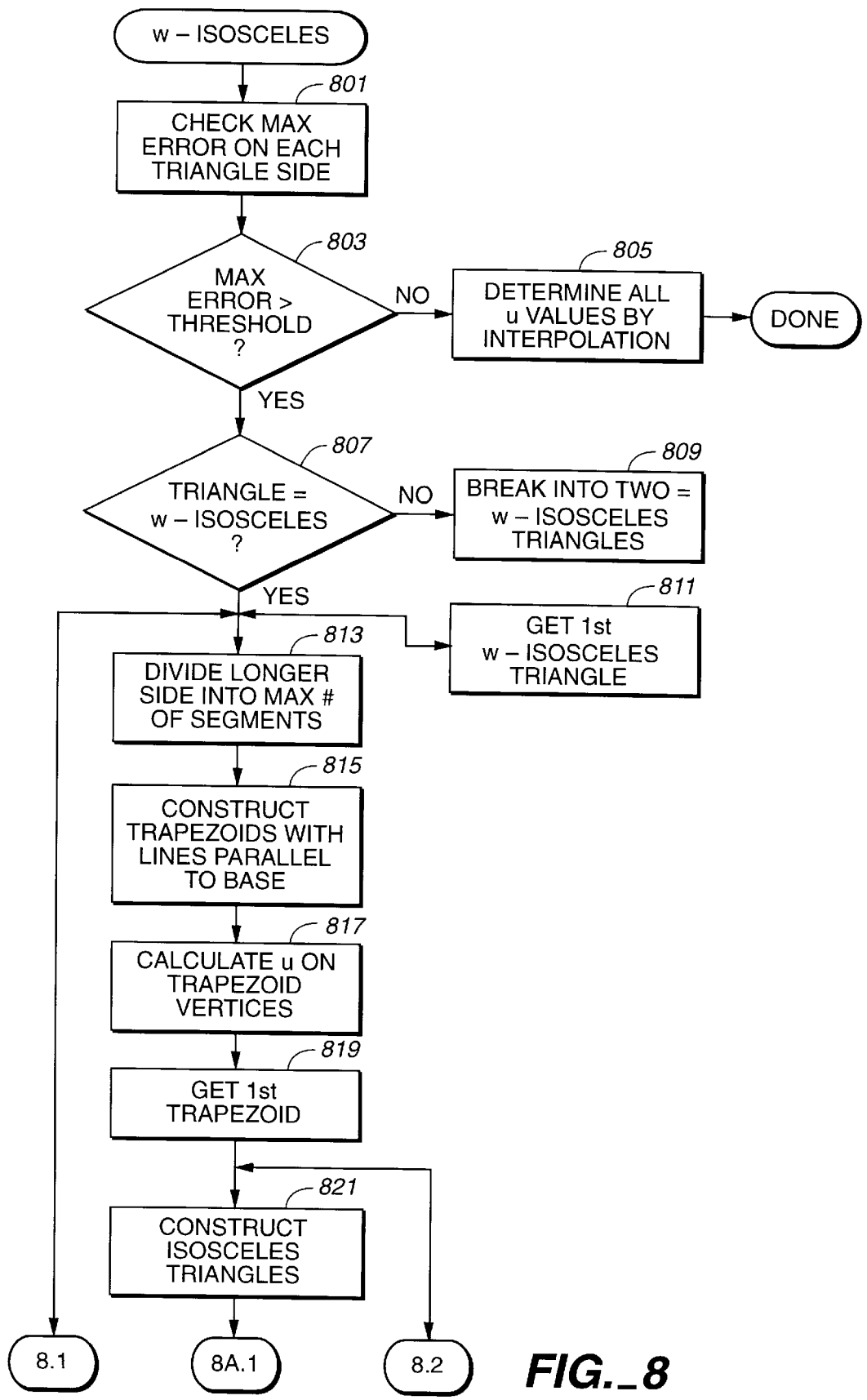
FIG._8

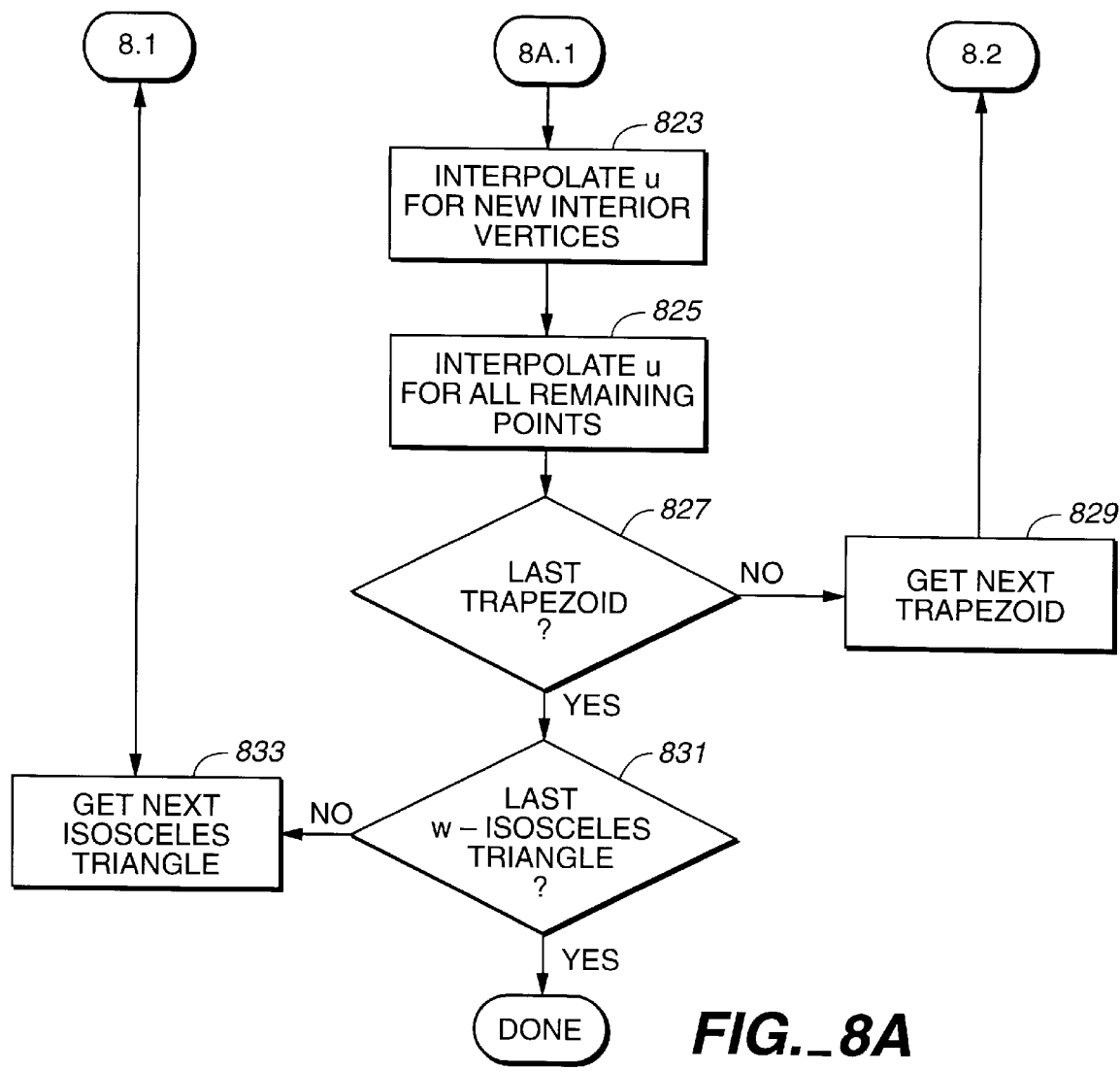
FIG._8A

METHOD AND APPARATUS FOR ADAPTIVE NONLINEAR PROJECTIVE RENDERING

CROSS-REFERENCE TO RELATED APPLICATION

This application claims priority to the provisional U.S. patent application entitled "NONLINEAR RENDERING USING ADAPTIVE SUBDIVISION", filed Feb. 19, 1997 in the name of Yakov Kamen and Leon Shirman, and identified by Ser. No. 60/038,111.

FIELD OF THE INVENTION

This invention relates to the field of computer graphics and, more specifically, to reducing the computational load for mapping surface characteristics onto a three-dimensional graphical model in a computer graphics system.

BACKGROUND OF THE INVENTION

In the field of computer graphics, it is commonplace to render three-dimensional objects in "object space" using a set of polygons. For simplicity, the polygons used are typically triangles, and other polygon shapes are usually broken down into triangles using an available method such as Delauney triangulation. Thus, an object may consist of a set of contiguous triangles each of which is positioned in three-dimensional space relative to the others such that together they form the shape of the desired object. Each of the triangles has a set of Cartesian coordinate values for each of its vertices. These coordinate sets uniquely define the location and orientation of the triangle in three-dimensional space.

Typically, in addition to the Cartesian coordinates, each triangle vertex is also defined by values indicating its surface characteristic, such as texture map coordinates (u,v) for texture mapping, red, green, blue color values (r,g,b,) for Gouraud shading, or vertex normal N (having x,y,z coordinates) for Phong shading. When displaying a three-dimensional object built from triangles, each triangle must first be transformed from the three-dimensional coordinate system to a homogeneous coordinate system. This is typically achieved using a perspective transformation, which results in a homogeneous coordinate value for each of the triangle vertices. That is, the transformation results in each triangle vertex being represented by horizontal and vertical display coordinates (x,y) (the z value is usually also retained for making visibility determinations), as well as the homogeneous coordinate w and surface values, such as texture map coordinates (u,v).

Depending on the application, a triangle may be shaded and/or texture mapped. Whether the shading is Gouraud shading or Phong shading, the shading process is very similar to that of texture mapping, and both contribute to the determination of a color for each pixel within the triangle. In both texture mapping and shading, a value, or values, indicative of pixel color must be assigned to each pixel of the triangle as defined in its homogeneous coordinate system. Typically, this is done by dividing the triangle into horizontal spans, each of which is one pixel width in the vertical direction, determining texture mapping or shading values for the end points of the span, and thereafter the values for the pixels in between. This process is described below for texture mapping, but is similar for the determinations of values for Gouraud or Phong shading.

Shown in FIG. 1 is a triangle 10 having three vertices $P_0$, $P_1$, $P_2$, each of which is uniquely defined by its own set of values (x,y,z,w,u,v). For a given span, such as span 12 shown in the figure, the values for each of the pixels in the span must then be determined. Each pixel is defined by its three-dimensional Cartesian coordinates (x,y,z), and by its value w found from the perspective transformation. However, the values of u and v needed for texture mapping must thereafter be calculated using w. This calculation process makes use of the values at the ends of the span containing the pixel, and very similar calculations would be used to determine r, g, b, or N for shading operations.

Referring again to FIG. 1, if vertex $P_0$ is defined by the values $(x_0, y_0, z_0, w_0, u_0, v_0)$, and vertex $P_1$ is defined by the values $(x_1, y_1, z_1, w_1, u_1, v_1)$, the desired values for endpoint $P_3$ of span 12 may be found from the values for $P_0$ and $P_1$. $P_3$ has Cartesian coordinates $x_3$ and $y_3$, and homogeneous coordinate $w_3$ may be determined as follows:

$$w_3 = (1-t)w_0 + tw_1$$

the value of $u_3$ for $P_3$ may be calculated as follows:

$$u_3 = ((1-t)u_0/w_0 + tu_1/w_1)/((1-t)/w_0 + t/w_1)$$

where t is a normalized position value (i.e., from 0 to 1) between $P_0$ and $P_1$, such that t=0 at $P_0$ and t=1 at $P_1$. Similarly, the value of $v_3$ for endpoint $P_3$ may be calculated as:

$$v_3 = ((1-t)v_0/w_0 + tv_1/w_1)/((1-t)/w_0 + t/w_1)$$

As with endpoint $P_3$, the values of $u_4$ and $v_4$ for endpoint $P_4$ may be calculated from the values defining vertex $P_1$ and those defining vertex $P_2$ (i.e., $x_2, y_2, z_2, w_2, u_2, v_2$), since a line segment containing $P_4$ extends between $P_1$ and $P_2$.

The values of u and v for points along a span, such as span 12 of FIG. 1, can be determined using the above equations relative to the values of u, v, w at the endpoints. Thus, for point $P_5$, located on span 12, the following calculations may be made:

$$u_5 = ((1-t)u_3/w_3 + tu_4/w_4)/((1-t)/w_3 + t/w_4)$$

and, $$v_5 = ((1-t)v_3/w_3 + tv_4/w_4)/((1-t)/w_3 + t/w_4).$$

In this manner, the u and v values for each pixel of each span may be found, until mapping for all of the pixels of the triangle is complete.

While performing the above calculations for each of the triangles of the object is the most accurate way to provide it with surface detail, it also typically requires a large number of calculations, and therefore results in a heavy processing burden. The largest computing cost of these calculations is performing the division functions. For example, the calculation necessary to determine $u_5$ requires five separate division functions. Although the values of $1/w_3$ and $1/w_4$ may be precalculated, this still requires one division function for each pixel of the triangle. Performing these divisions are extremely costly in terms of circuitry and performance.

One way to reduce the number of divisions performed is to replace the above formula for u or v with a linear approximation which assumes that $w_0 = w_1$. For example, the linear approximation for determining the value $u_5$ for point $P_5$ may be expressed as follows:

$$u_5 = (1-t)u_3 + tu_4$$

A similar linear approximation may be used to determine values for v, r, g, b, or N. The linear approximation requires no division to compute, and is therefore significantly faster to calculate on a digital computer than the exact formula. However, when $w_3$ and $w_4$ are not close in value, the approximation is correspondingly inaccurate. As a result, images which use texture mapping or shading that relies on this type of linear approximation tend to have visible artifacts, the severity of which depend on the difference between the values of w for the two endpoints which would otherwise be used for the calculation.

U.S. Pat. No. 5,594,846 to Donovan discloses a span-based rendering approach which breaks each span into multiple segments, the points separating the segments having a surface characteristic value, such as u, calculated mathematically in the manner described above. The u values for the portions of the span between the calculated points are then determined by interpolation. The calculated points separating the segments are selected so that the segments formed are as long as possible without the error in u resulting from the use of interpolation exceeding a predetermined amount. The Donovan method thereby allows a relatively low number of computations, while keeping errors below a desired threshold. Nonetheless, the span-by-span process of breaking the span into segments requires each new point determined on each span to be calculated using at least one division operation.

SUMMARY OF THE INVENTION

The present invention allows a significant reduction in the processing time and resources needed for mapping a surface model (i.e. the desired values for texture mapping or shading) onto a polygon of a polygon-based graphically represented object in a homogeneous coordinate system by using adaptive subdivision of the polygon to divide the polygon into successively smaller polygons until the maximum error on the sides of all resulting polygons (and on the diagonals if the polygons have greater than three sides) is below a predetermined threshold. The appropriate values from the surface model for the vertices of the polygon are known in advance, and are obtained for use in the method of the invention. The sides of the polygon (and the diagonals, if necessary) are then tested to determine a maximum error on each which would result from the use of linear interpolation to determine surface model values along that side or diagonal and, if the error on any side or diagonal exceeds a predetermined threshold, the polygon is subdivided into subpolygons. The testing process is repeated for the previously untested sides of the subpolygons and, if any side or diagonal exceeds the threshold, the subpolygon or subpolygons containing such a side or diagonal are subdivided. This process continues until no polygon side or diagonal exceeds the threshold value, at which point the remaining values from the surface model to be assigned to the points of the polygon, or subpolygons, are determined by linear interpolation along the sides of the polygon, or subpolygons, and along the horizontal spans of the polygon, or subpolygons.

Limiting error testing to the sides of a polygon is sufficient to ensure that all errors, on sides and spans alike, will be below the desired threshold. Applicants have discovered that maximum errors resulting from linear interpolation always lie on the polygon sides (and/or diagonals, for polygons with greater than three sides). In the present invention, polygons with greater than three sides are preferably divided into triangles in a known manner to simplify the rendering process. Once the triangles have been subdivided to the point that the sides of all the triangles have a maximum error which is below the selected threshold, all remaining points may be calculated by linear interpolation, with the confidence that none of these other interpolations will also represent an error which is above the threshold. Thus, the number of surface model assignments which must be calculated using division operations is significantly reduced, while the severity of visual artifacts resulting from the interpolations is held below a predetermined acceptable threshold.

The invention is particularly appropriate for functions such as texture mapping, or Gouraud or Phong shading, all of which require mapping from a surface model to the rendered object. The object is rendered in homogeneous coordinates (e.g. x, y, w), such as are obtained by transforming the initially-rendered three-dimensional object using a perspective transform. Once the appropriate mapping values are obtained for the vertices of the triangle, the maximum error for each of the triangle sides can be found using the formula:

$$e = ((x_1-x_0)^2 + (y_1-y_0)^2)^{1/2} \cdot (1-\sqrt{\alpha})/(1+\sqrt{\alpha})$$

where a first endpoint for the side is vertex $P_0$, having the coordinates $(x_0, y_0, w_0)$, a second endpoint for the side is vertex $P_1$, having the coordinates $(x_1, y_1, w_1)$, and $\alpha = \min(w_0, w_1)/\max(w_0, w_1)$.

The subdivision of the triangle may be made in a number of different ways. By creating a new triangle side between an existing vertex and one of the original triangle sides, the triangle is subdivided into two triangles. A second new side likewise creates a third subtriangle. When creating a new triangle side, intersecting it with an original triangle side at that side's midpoint simplifies the calculation of the values for the new vertex created at the intersection. Alternatively, the original side may be intersected at the point of maximum error along that side, thereby reducing the possibility of needing additional subdivisions along that side. In one embodiment, the triangle is subdivided into four subtriangles, a new vertex being placed at the midpoint of each of the original triangle sides. Thus, each of the subtriangles is similar to the original.

The invention also covers several non-recursive methods of subdividing a triangle. The first, uniform subdivision, involves first checking that at least one side of the triangle has a maximum error which would exceed a predetermined threshold. If so, the sides of the triangle are checked to determine how many segments each would have to be broken into to keep the maximum error for each side below the threshold. Of the numbers of necessary segments for the different sides, the largest of those numbers is used as the number of segments into which each of the sides will be divided. Each of the triangle sides is then subdivided into segments of equal length, the total number of segments per side being the previously determined "largest" number. New vertices are then created at the points separating the segments of each side, and are interconnected with lines, each of which is parallel to one of the three sides of the triangle, such that a plurality of interior triangles are created. The desired surface model values are then calculated exactly for each of the vertices of the created triangles, and the values for the remaining pixels are thereafter determined by linear interpolation.

In another non-recursive subdivision method, the triangle is divided (if necessary) so that only w-isosceles triangles exist. A w-isosceles triangle is a triangle for which two of the three vertices have the same value for homogeneous coordinate w. In this embodiment, each w-isosceles triangle is then divided into a plurality of trapezoids, with the parallel sides of the trapezoids being parallel to the base of the w-isosceles triangle, and where the base is the side bounded by two vertices having equal values of w. The desired surface model values (e.g., u) are calculated exactly for the vertices of each trapezoid. Each trapezoid is then broken into subtriangles, most or all of which are geometrically isosceles, as well as being w-isosceles. The desired surface model values for the interior vertices of the subtriangles are then found using linear interpolation. Once these are determined, the values for the remaining pixels are determined by linear interpolation. This process is performed for each of the trapezoids of each of the w-isosceles triangles.

BRIEF DESCRIPTION OF THE DRAWINGS

FIG. 1 is a graphical diagram depicting a prior art method of mapping surface detail to a polygon using horizontal spans.

FIG. 2 is a schematic block diagram of a computer system suitable for use with the presentation;

FIG. 2A is a more detailed schematic block diagram of the video controller shown in FIG. 2.

FIG. 3A is a graphical depiction of a triangle into which surface detail is to be mapped according to the present invention.

FIG. 3B is a flowchart demonstrating the procedure for mapping surface detail according to the present invention.

FIG. 4 is a graphical depiction of a triangle subdivided into four subtriangles in accordance with the present invention.

FIG. 5 is a graphical depiction of a triangle subdivided into two subtriangles in accordance with the present invention.

FIG. 6 is a graphical depiction of a triangle subdivided into three subtriangles in accordance with the present invention.

FIG. 7 is a flowchart demonstrating a non-recursive uniform triangle subdivision method of the present invention.

FIG. 7A is a graphical depiction of a triangle subdivided according to the method shown in FIG. 7.

FIGS. 8–8A are a flowchart depicting a non-recursive triangle subdivision method in which a w-isosceles triangle is broken into trapezoids each having interior subtriangles.

FIG. 8B is a graphical depiction of the subdivision of a triangle using the method shown in FIGS. 8–8A.

DETAILED DESCRIPTION OF THE PREFERRED EMBODIMENTS

At the outset, it should be noted here that the components of this invention may be conveniently implemented using a conventional general purpose digital computer programmed according to the teachings of this specification, as will be apparent to those skilled in the computer arts. Appropriate software coding can be readily prepared based on the teachings of the present disclosure, as will be apparent to those skilled in the software art. The present invention may also be implemented by the preparation of application specific integrated circuits or by interconnecting an appropriate network of conventional component devices and circuits, as will be readily apparent to those skilled in the art.

FIG. 2 illustrates the system architecture for a computer system 100, such as an IBM PC compatible computer with which the invention can be implemented. The exemplary computer system of FIG. 2 is for descriptive purposes only. Though the description below may refer to terms commonly used in describing particular computer systems, such as an IBM PC compatible computer, the description and concepts equally apply to other systems, including systems having architectures dissimilar to FIG. 2.

The computer system 100 includes a central processing unit (CPU) 105, which may include a conventional microprocessor, random access memory (RAM) 110 for temporary storage of information, and read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components.

Mass storage may be provided by diskette 142, CD-ROM 147 or hard disk 152. Data and software may be exchanged with computer system 100 via removable media such as diskette 142 and CD-ROM 147. Diskette 142 is insertable into diskette drive 141, which is, in turn, connected to bus 130 by controller 140. Similarly, CD-ROM 147 is insertable into CD-ROM drive 146, which is in turn, connected to bus 130 by controller 145. Finally, hard disk 152 is part of a fixed disk drive 151, which is connected to bus 130 by controller 150.

User input to computer system 100 may be provided by a number of devices. For example, keyboard 156 and mouse 157 are connected to bus 130 by keyboard and mouse controller 155. An optional peripheral device 196 may be connected to bus 130 by controller 197, which may be an RS-232 serial port controller or a parallel port controller. It will be obvious to those reasonably skilled in the art that other input devices such as a pen and/or tablet and a microphone for voice input may be connected to computer system 100 through bus 130 and an appropriate controller/software. DMA controller 160 is provided for performing direct memory access to system RAM 110. A visual display is generated by a video controller 165, which controls video display 170.

Turning briefly to FIG. 2A, video controller 165 includes bus interface 166 coupled to the bus 130 to allow preferably bidirectional informational exchange of graphics and status information between CPU 105 or other devices within computer 100 accessible to the bus 130 and video controller 165. Furthermore, video controller 165 also includes graphics processor 167 coupled to bus interface 166, video memory 168 and driver circuit 169 coupled to display 170. Graphics processor 167 receives graphics information including video commands, status information and image data placed on bus 130 in a known manner through bus interface 166. In turn, graphics processor 167 interprets the received video commands or status information and carries out appropriate graphics processing tasks responsive thereto. These tasks are based in part on graphics routines or threads stored as program code statements contained on a storage medium located either within, or external to, the graphics processor 167. Such a storage medium can include on-board video memory 168 as well as ROM memory 167a disposed internally within as an integrated component of the graphics processor 167.

In addition, on-board memory 168 includes one or more frames of image data undergoing processing by the aforementioned graphics processor 167. Once a frame of image data is processed, graphics processor 167 transfers the frame to driver circuit 169 to develop corresponding driving signals for transmission thereby to display 170, as is known in the art.

Referring again to FIG. 2, computer system 100 also includes a communications adapter 190 which allows the system to be interconnected to a local area network (LAN) or a wide area network (WAN), or the Internet schematically illustrated by bus 191 and network 195. Alternatively, communication adapter 190 may be a PCMCIA bus adapter which allows any number of peripherals adhering to the PCMCIA standard to be interfaced with computer system 100 in a manner within the scope of those skilled in the art.

Computer system 100 is generally controlled and coordinated by operating system software, such as the OS/2® operating system, available from the International Business Machines Corporation, Boca Raton, Fla. or Windows NT, available from Microsoft Corp., Redmond, Wash. The operating system controls allocation of system resources and performs tasks such as process scheduling, memory management, and networking and I/O services, among other things.

In each of the following preferred embodiments of the present invention, the below-described surface mapping techniques and at least one of recursive or non-recursive triangle subdivision methods take the form of interdependent routines executing on a general purpose processing system such as computer 100 described hereinabove. These routines permit computer 100 to carry out the nonlinear projective rendering techniques and processes of the preferred embodiments when computer 100 reads and executes their corresponding programming instructions from a computer readable storage medium.

The storage medium containing these routines may include any type of disk media including floppy disk 142, optical disk such as CD-ROM 147 or magneto-optical variations thereof, hard drive 152 or disk arrays whether located within or external to computer 100. Alternatively, the storage medium can include ROM 115, System RAM 110, EPROM, EEPROM, Flash EEPROM or any other type of media suitable for storing computer readable instructions, as well as any routine combinations thereof as understood by those ordinarily skilled in the art.

Alternatively, these routines may be incorporated in a storage medium addressable by the graphics processor 167 (FIG. 2A), such as video memory 168 or ROM memory 167a integrated within the graphics processor 167. In turn, graphics processor 167 of the video controller 165 may execute the nonlinear rendering processes and routines described hereinafter independently using graphics information placed on bus by the CPU 105 or other devices coupled to the bus 130.

The present invention provides for the linear approximation of values for texture mapping and/or Gouraud or Phong shading from a three-dimensionally modeled object. The preferred embodiment of the present invention is equally applicable to three-dimensional rendering with different types of polygons. However, for polygons having more than three sides, the rendering process is simplified by reducing them to triangles by a method such as Delauney triangulation. Thus, the following description is with regard to rendering with triangles. However, those skilled in the art will recognize that the principles of the invention may be extended to other shapes as well.

Shown in FIG. 3A is a triangle in "display space," that is, in a two-dimensional coordinate system which corresponds to the pixels of the image to be displayed to a user. As discussed above, a graphical image is typically defined in three-dimensional space, and thereafter transformed into a two-dimensional viewing space through, e.g., a perspective transformation. In the embodiment of FIG. 3A, the use of a perspective transformation results in the vertices of the triangle, $P_0$, $P_1$, $P_2$, each being defined by a set of values which includes an x coordinate, a y coordinate, and a homogeneous coordinate w, as well as appropriate surface model parameters, such as texture mapping coordinates (u,v). It is then necessary to determine the surface model values for the other pixels of the triangle. The following description refers to finding values for texture mapping variable u. For texture mapping, the process would then be repeated to determine the appropriate values for texture mapping variable v. Those skilled in the art will recognize that this procedure is equally applicable to finding values for r,g,b (Gouraud shading) or for N (Phong shading).

The various embodiments of the invention apply linear interpolation to the determination of surface mapping values for pixels of the triangle in a selective manner which avoids the occurrence of visible artifacts due to errors caused by the interpolation which are excessive in nature. In general, each of the triangle sides are tested for the maximum error which would be incurred by the use of linear interpolation rather than an exact calculation. If the maximum error is less than a predetermined threshold, interpolation is used to render all pixels within the triangle. However, if the maximum error of any side exceeds the threshold, the triangle is subdivided to reduce the maximum error for each triangle side below the threshold.

A recursive method for mapping surface detail according to the present invention is shown in FIG. 3B. In step 301 of FIG. 3B, the size of the triangle is determined to see if it is necessary to test the maximum errors. If, in step 303, it is determined that the triangle is sufficiently small (e.g., each side less than two pixels in length), then the values for u at the vertices of the triangle are used to interpolate the values of u for each of the other pixels of the triangle (step 305). In this case, the triangle is so small that the use of linear interpolation does not result in any significant visual artifacts.

If the test of step 303 results in a determination that the triangle is larger than the maximum size which allows straight linear interpolation in step 305, the maximum error which would result from the use of linear interpolation is then found for each of the triangle sides (step 307). The maximum error for a given side is found using the values of x, y, w for each of the two vertices at the endpoints of that side. For example, to determine the maximum error e of triangle side 14 of FIG. 3A, the values of x, y, w of vertex $P_0$ (i.e., $x_0$, $y_0$, $w_0$) and of vertex $P_1$ (i.e., $x_1$, $y_1$, $w_1$) are used in the following equation:

$$e=((x_1-x_0)^2+(y_1-y_0)^2)^{1/2}\cdot(1-\sqrt{\alpha})/(1+\sqrt{\alpha})$$

where $\alpha=\min(w_0, w_1)/\max(w_0, w_1)$.

Referring again to FIG. 3B, if the value of e for any of the three sides of the triangle (e.g. sides 14, 16, 18 of the triangle of FIG. 3A) is greater than a predetermined threshold value (step 309), the triangle is subdivided (step 311), and the procedure repeated for the triangles created by the subdivision. As shown in step 313, the process advances to the "next triangle" which, if a triangle was just subdivided, could be one of the triangles created in the subdivision. When, for a particular triangle, no side of the triangle has a maximum error that exceeds the threshold in step 309, the remaining points of the triangle are mapped using linear interpolation (step 305). A check is then performed to determine whether all the triangles have been tested (step 315) and, if not, the procedure is applied to the next untested triangle (step 313). Once all of the triangles have had all their points mapped, the procedure terminates.

The threshold value for the above procedure is predetermined and particular to the application in question. In general, a higher image quality results from a lower threshold value, since the maximum allowable approximation error is reduced. However, as a computational tradeoff, a lower threshold value also typically requires a greater amount of subdividing of the triangles of the object.

As described above, the testing of the maximum error value for the preferred embodiment is limited to the sides of the triangle. For example, for the triangle shown in FIG. 3A, only sides 14, 16, 18 of the triangle are tested to determine whether the maximum error along those sides exceeds the threshold. This is because applicants have discovered that the maximum errors along the sides of the triangle, will always be greater than those on the spans. Once the necessary subdivisions of the triangle have reduced all of the maximum errors along the sides of the resulting triangles to an amount below the threshold, the maximum errors along the spans of the triangles will also be below the threshold. Thus, linear interpolation may thereafter used to determine the u and v values for all of the other pixels of the triangle.

For a triangle-based rendering, there are a variety of different recursive embodiments which involve the manner in which the triangle is subdivided, should the maximum error on one of the triangle sides exceed the threshold. In FIG. 4 is shown a triangle which, according to the present invention, has been subdivided into four separate triangles by connecting the midpoints of each of the sides of the triangle. These midpoints thereby become new vertices $P_3$, $P_4$, $P_5$. By dividing the triangle in this manner, hardware implementation is made easier due to the simplicity of the subdivision. Furthermore, since each of the four subtriangles is similar to the original triangle, the necessary setup calculations for the subtriangles are also simplified.

FIG. 5 depicts a triangle which has been subdivided into two triangles by creating new vertex $P_4$, which is one endpoint of the new triangle side extending between $P_0$ and $P_4$. When subdividing a triangle in this manner, a new vertex is preferably created along any side for which the maximum error exceeds the threshold. In the subdivision shown in FIG. 5, the vertex $P_4$, at which side 16 is divided, may be located at the midpoint between vertices $P_1$ and $P_2$. Selecting the midpoint of the side as the location for the new vertex simplifies the subdivision process, since the t value for the new vertex will be 0.5. However, the point $P_4$ may also be selected as the point of maximum error along the side 16 being divided. By using the point of maximum error as the dividing point, the likelihood is increased that the new triangle sides created to either side of the new vertex will be below the threshold. This point of maximum error is located by its t value, which is determined by the following formula:

$$t_{maxerror}1 = /(1+\sqrt{(w_2/w_1)})$$

In the procedure described above, each of the triangle sides for which the maximum error exceeds the threshold is divided with a new vertex. In the example shown in FIG. 6, triangle sides 14 and 16 have both been divided, each having been found to have a maximum error which exceeds the threshold. As with a single divided side, these two divided sides may be divided at the midpoint, or at the point of maximum error for each side. In either case, the original triangle is subdivided into three triangles.

Regardless of the number of subdivisions, the new triangle sides are checked to see if the maximum error for any of those sides exceeds the threshold. If so, the triangle is subdivided again. If not, the values of u for the new vertices are calculated exactly (i.e., involving division by w). The values for u for the points along the new triangle sides created by the new vertices are then found by linear interpolation. Thereafter, linear interpolation is also used for the points along spans connecting the sides of the triangle, as described above. The entire procedure is then repeated for each of the triangles which have been used to render the object.

The method of FIG. 3B, including each of the different types of subdivision described in conjunction with FIGS. 4–6, allows the procedure to be limited to only as many subdivisions as are necessary. However, the method is also recursive in that it requires the repeated checking of triangle sides and progressive subdividing of triangles to create new triangles. Recursive algorithms are generally not well-suited for hardware acceleration, due to high memory requirements. Below are described two subdivision methods according to the present invention which do not require recursion.

As with the recursive methods, the following methods take advantage of the fact that maximum errors in a triangle caused by the use of linear interpolation will always reside on the triangle sides. FIG. 7 is a flowchart demonstrating a method which uses the uniform subdivision of a triangle, that is, the subdivision of a triangle in which there is an equal number of subdivision points on each side of the triangle.

In step 701 of FIG. 7, the maximum error is checked for each of the triangle sides, in the same manner as described for the embodiments above. If the maximum error for each of the triangle sides does not exceed a threshold value (step 703), all the u values of the triangle are determined by linear interpolation (step 705) and the procedure terminates. As with the previous embodiments, this embodiment is described with reference to the determination of u values, but those skilled in the art will recognize that the same method applies to the determination of v coordinates or the values necessary for Gouraud or Phong shading.

If, in step 703, it is found that at least one of the sides has a maximum error which exceeds the threshold value, the sides of the triangle are broken into segments by creating new vertices on the triangle sides. First, each side is checked to determine the maximum number of segments which would be necessary for that side to prevent a maximum error that is greater than the threshold value (step 707). This maximum number of segments, n, can be found for each side using the values at each vertex bounding that side, and the maximum error e for the side. For example, side 14 of the triangle shown in FIG. 3A, being bounded by vertices $P_0$ and $P_1$, has a maximum number of segments n which may be found as follows:

$$n = l/(e+2\sqrt{(el/(\beta-1))})$$

where l is the length of the side and $\beta = 1/\alpha = \max(w_0, w_1)/\min(w_0, w_1)$.

After the maximum number of segments n is determined for each side, the largest of the values n for each of the three sides is selected as the number of segments into which each side is broken. Thus, n−1 new vertices are located along each side, equidistant from each other and from the vertices at the ends of the side (step 709). Connecting the new vertices with interior spans parallel to the triangle sides results in the creation of a number of subtriangles (step 711). FIG. 7A shows the subdivision of the triangle of FIG. 3A in this manner, when each of the sides has been divided into three segments. The u values for the new vertices of each resulting subtriangle, including those in the interior as well as those on the triangle sides, are then calculated exactly (step 713). Finally, the remaining u values for the other pixels in the triangle are found using linear interpolation (step 715). Since the sides are divided into small enough segments to prevent the maximum interpolation error from exceeding the threshold value, the same will be true for the maximum error on the interior spans of the triangle. Furthermore, recursion was not necessary for this method, thus preventing an overtaxing of the system memory.

FIGS. 8–8A demonstrate another non-recursive method of subdividing a triangle. As above, this method is described in terms of texture mapping value u, but is equally applicable to determining texture mapping value v, or the necessary mapping values for Gouraud or Phong shading. In this method, the subdivision takes advantage of the characteristics of w-isosceles triangles (i.e. triangles for which the value of w is equal at two vertices). This method, like the others, starts by checking the maximum error on each side of the triangle (step 801) in the same manner as described for the above embodiments. If the maximum error is not greater than a predetermined threshold value for any of the triangle sides (step 803), all the u values are determined by interpolation (step 805), and the procedure terminates.

If, in step 803, the maximum error for any of the sides is greater than the threshold value, the w values at the vertices of the triangle are then checked to determine whether the triangle is w-isosceles (step 807). If the triangle is not w-isosceles, it must be broken into two w-isosceles triangles (step 809). Since the value of w changes linearly along each of the triangle sides, this dividing of the triangle may be easily accomplished by linearly interpolating along one of the triangle sides to find a point at which the value of w is the same as the w value of a vertex opposite that side. Creating a new triangle side from that point and the opposing vertex results in two triangles which share the same base, that base having two endpoints, each with the same w value.

Once the triangle is divided into w-isosceles triangles, one of the isosceles triangles is selected (step 811), and the method proceeds to step 813. If the original triangle was determined to be w-isosceles, the method would have advanced directly from step 807 to step 813. In the description below, the side of the w-isosceles triangle having two endpoints with equal values of w is referred to as the "base," while the term "side" is used to describe each of the two non-base sides of the triangle. In step 813, the longer of the two sides of the triangle (if either is longer) is divided into the minimum number of segments necessary to prevent a maximum error e along that side from exceeding a threshold value. This division is accomplished by finding the maximum possible offset along that side from a first vertex.

If the triangle being subdivided is that shown in FIG. 3A, and the longer of the two sides is side 14, side 14 is divided between vertices $P_0$ and $P_1$. The maximum offset $\Delta x$ may then be found as follows:

$$\Delta x = e + 2\sqrt{((ew_0)/(w_1-w_0))}$$

where e is the maximum error for the side, calculated as shown above, $w_1$ is the value of w at vertex $P_1$, and $w_0$ is the value of w at vertex $P_0$.

This formula provides the location of the first new vertex along side 14 relative to $P_0$. The next $\Delta x$ may then be found as described above, using the values for $P_1$ and the newly created vertex. This gives the location of the next new vertex. The process continues until the value for the maximum offset $\Delta x$ exceeds the remaining distance along the triangle side, at which point all new vertices along that side are established.

Once the new vertices along side 14 of the triangle are created, trapezoids are created from the triangle by forming new bases which extend from the newly created vertices of side 14 to the opposite side (side 18 in FIG. 3A), and which are parallel to the base 16 (step 815). A graphical representation of this type of division of the triangle is demonstrated by FIG. 8B. After the trapezoids are created, the u values for the trapezoid vertices are calculated exactly (step 817). Then each trapezoid is individually operated on, the first trapezoid being selected in step 819.

In step 821, isosceles triangles are constructed within the trapezoid being examined. These triangles are constructed, starting at the longer of the non-base sides of the original triangle. This is demonstrated using the triangle of FIG. 8B. Taking, for example, trapezoid 20, an isosceles triangle 22 is formed by extending a new side 23 from the vertex at which side 14 meets the shorter parallel base of the trapezoid 20, to a point along the longer base of the trapezoid 20. This point is selected such that the length of triangle side 23 is equal to the length of the trapezoid side which is colinear with side 14 of the original triangle. Thus, the newly created triangle 22 is a geometrically isosceles triangle. In addition, since the longer base of trapezoid 20 is a line of constant w value, triangle 22 is also a w-isosceles triangle.

After the creation of triangle 22, another isosceles triangle 24 is formed by extending a side from the intersection of side 23 and the longer base of trapezoid 20, to an intersection point with the shorter parallel side of the trapezoid 20. The new side is the same length as side 23, thus creating another triangle 24, both geometrically isosceles and w-isosceles. This process continues until no more room for similar geometrically isosceles triangles remains in the trapezoid 20. A final triangle side is created between the intersection point of the last new triangle side and the longer base of the trapezoid 20, and the point at which the shorter base intersects side 18 of the original triangle. This creates two more triangles, which are not geometrically isosceles, but are nonetheless w-isosceles.

Referring again to FIG. 8, once the interior triangles of the trapezoid being examined are constructed (step 821), the values of u for the newly created vertices of the interior triangles are determined by interpolation. Since the values for u at the vertices of the trapezoid were calculated, and since u changes linearly for lines of constant w, the use of interpolation along the parallel bases of the trapezoid results in an exact value for u at each of the new vertices. This interpolation is depicted as step 823 in FIG. 8A. Having the u values for all the vertices of the interior triangles allows the rest of the u values for the triangles to be determined by interpolation (step 825). Because the non-parallel sides of the trapezoid are short enough to prevent an error e greater than the threshold value, and since no interior triangle side is longer than those non-parallel trapezoid sides, interpolation can be used for those interior u points with the confidence that no error resulting from the interpolation of u for those points will exceed the threshold either.

In step 827, the process checks to determine whether the u values for all of the trapezoids have been determined. If not, the process moves to the next trapezoid (step 829), and is repeated starting with step 821. If no more trapezoids for that triangle remain, it is determined whether there is another w-isosceles triangle (step 831) which would have resulted from a division of the original triangle, and which has yet to be examined. If so, the process moves to the next w-isosceles triangle (step 833), and is repeated starting with step 813.

The non-recursive methods of FIGS. 7–8B do not require the repetition of the recursive methods of FIGS. 3–6. However, some basic principles exist in both methods. All the methods rely on the fact that the maximum error which would result from an interpolation to determine u (rather than a straight mathematical calculation) will always reside on one of the sides of the triangle. This allows the implementation of the above methods, which use interpolation freely once it is known that the triangles have been reduced to a size for which the sides of the triangles are short enough that a maximum error which would be found on them is below a given threshold.

While the invention has been shown and described with regard to a preferred embodiment thereof, those skilled in the art will recognize that various changes in form and detail may be made herein without departing from the spirit and scope of the invention as defined by the appended claims. As mentioned above, the techniques described herein with regard to texture mapping coordinate u may also be used to assign values of texture mapping coordinate v, and are equally applicable to other types of nonlinear mappings, such as Gouraud shading and Phong shading. For Gouraud shading, the color values red (r), green (g) and blue (b) can be approximated in a perspectively correct manner through simple substitution of these values in place of the u and v values used in the texture mapping embodiments described above. Likewise, normal values N can be substituted for the u and v values in order to obtain appropriate perspectively correct approximation when Phong shading surface detailing is employed.

What is claimed is:

1. A method of mapping a graphical surface model, comprising a plurality of model values, onto a polygon of a perspective projection of a polygon-based, graphically-represented object defined by points within an object coordinate system, the method comprising the steps of:
   a) subdividing the polygon into subpolygons each having a plurality of sides and a plurality of vertices, the subdivision being such that, given exact model values to be assigned to the vertices, the determination of model values by linear interpolation over the length of any one subpolygon side does not produce an interpolation error which exceeds a predetermined threshold value;
   b) determining the exact model values for the vertices of the sub-polygons; and
   c) determining the model values corresponding to the non-vertex object points by interpolation.

2. A method according to claim 1 wherein the polygon is a triangle.

3. A method according to claim 1 wherein, for a given subpolygon, the plurality of vertices includes a first vertex $P_0$ having object coordinates $(x_0, y_0, w_0)$ and a second vertex $P_1$ having object coordinates $(x_1, y_1, w_1)$, and wherein determining the maximum error for a subpolygon side bounded by vertex $P_0$ and vertex $P_1$ comprises finding a maximum error e such that:

$$e = ((x_1-x_0)^2 + (y_1-y_0)^2)^{1/2} \cdot (1-\sqrt{\alpha})/(1+\sqrt{\alpha})$$

where $\alpha = \min(w_0, w_1)/\max(w_0, w_1)$.

4. A method according to claim 1 wherein subdividing the polygon further comprises subdividing the polygon such that a new vertex is created along a first side of the polygon for which a maximum interpolation error exceeds the threshold value.

5. A method according to claim 4 wherein said new vertex is located substantially at the point of maximum interpolation error for the first side.

6. A method according to claim 5 wherein the first side is bounded by a first vertex $P_0$ having object coordinates $(x_0, y_0, w_0)$ and a second vertex $P_1$ having object coordinates $(x_1, y_1, w_1)$, and wherein the point of maximum error $t_{maxerror}$ for the first side is determined as:

$$t_{maxerror} = 1/(1+\sqrt{(w_1/w_0)}).$$

7. A method according to claim 4 wherein said new vertex is located substantially at the midpoint of the first side.

8. A method according to claim 1 wherein the polygon is a triangle and subdividing the triangle comprises subdividing the triangle into four triangles such that a new vertex is created at the midpoint of each of the original triangle sides.

9. A method according to claim 1 wherein said interpolation is linear interpolation.

10. A method of mapping a graphical surface model, comprising a plurality of model values, onto a triangle of a perspective projection of a triangle-based, graphically-represented object defined by points within an object coordinate system, the method comprising the steps of:
    a) obtaining the exact model values for each vertex of the triangle;
    b) determining, for each side of the triangle, a maximum interpolation error which would result from the use of interpolation, based on the model values of the vertices at the endpoints of that side, to assign model values to all object points along that triangle side;
    c) comparing the maximum error for each side to a predetermined threshold value;
    d) subdividing the triangle into subtriangles and repeating steps (a), (b), (c) and (d) for each subtriangle if the maximum error for any of the triangle sides exceeds the threshold value; and
    e) determining the model values corresponding to the non-vertex object points using interpolation.

11. A method according to claim 10 wherein, for a side having a vertex $P_1$ with object coordinates $(x_1, y_1, w_1)$ at a first end, and a vertex $P_0$ with object coordinates $(x_0, y_0, w_0)$ at a second end, the maximum error for that side is:

$$e = ((x_1-x_0)^2 + (y_1-y_0)^2)^{1/2} \cdot (1-\sqrt{\alpha})/(1+\sqrt{\alpha})$$

where $\alpha = \min(w_0, w_1)/\max(w_0, w_1)$.

12. A method according to claim 10 wherein subdividing the triangle comprises creating a new vertex substantially at the point of maximum interpolation error along one of the triangle sides, and wherein, if the side has a vertex $P_1$ at a first end with a homogeneous coordinate $w_1$, and a vertex $P_2$ at a second end with a homogeneous coordinate $w_2$, the point of maximum interpolation error $t_{maxerror}$ for that side is determined as:

$$t_{maxerror} = 1/(1+\sqrt{(w_1/w_0)}).$$

13. A method according to claim 10 wherein subdividing the triangle comprises creating a new vertex substantially at the midpoint of a triangle side along which it is created.

14. A method according to claim 10 wherein subdividing the triangle comprises subdividing the triangle into four triangles such that a new vertex is created at the midpoint of each of the original triangle sides.

15. A method of mapping a graphical surface model, comprising a plurality of model values, onto a triangle of a perspective projection of a triangle-based, graphically-represented object defined by points within an object coordinate system, the triangle having a plurality of sides and a plurality of vertices, the method comprising the steps of:
    a) creating new vertices along the triangle sides such that each of the triangle sides is divided into a plurality of sections, the length of each section being such that, given exact model values to be assigned to the vertices, the determination of model values by linear interpolation over the length of any one section does not produce an error which exceeds the threshold value;

b) interconnecting the new vertices with line segments parallel to the original triangle sides, such as to create interior subtriangles having vertices at crossing points between the line segments;

c) determining the exact model values for each of the vertices of the subtriangles; and d) determining the model values corresponding to the non-vertex object points using interpolation.

16. A method according to claim 15 further comprising omitting steps a–c if, for each side of the triangle, no interpolation error which would result from the use of interpolation in assigning model values to object points along that side of the triangle would exceed the threshold value.

17. A method of mapping a graphical surface model, comprising a plurality of model values, onto a w-isosceles triangle of a perspective projection of a triangle-based, graphically-represented object defined by points within an object coordinate system, the triangle having two sides and a base, the base being bounded by two vertices each having a homogeneous coordinate w of the same value, the method comprising the steps of:

a) dividing the triangle into a plurality of trapezoids each having four vertices, two bases parallel to the base of the triangle, and two sides, each of which is colinear with one of the triangle sides, the length of the trapezoid sides being such that, given the exact model values to be assigned to the vertices of the trapezoid, the interpolation of model values along the sides of the trapezoid results in no interpolation error that exceeds a predetermined threshold value;

b) determining the exact model values for the vertices of each trapezoid;

c) subdividing the interior of each trapezoid into a plurality of w-isosceles subtriangles; and d) determining the model values for the remaining object points of the triangle by interpolation.

18. A method according to claim 17 wherein step (c) further comprises forming a plurality of geometrically isosceles subtriangles within each trapezoid.

19. A method according to claim 17 further comprising omitting steps a–c if, for each side of the triangle, no interpolation error which would result from the use of interpolation in assigning model values to object points along that side of the triangle would exceed the threshold value.

20. A method according to claim 17 further comprising creating said w-isosceles triangle by dividing a triangle which is not w-isosceles into two w-isosceles triangles.

21. A method according to claim 17 wherein step (d) comprises first determining the model values for the vertices of the isosceles subtriangles by interpolation, and thereafter determining the model values for the other remaining object points of the triangle by interpolation.

22. A computer program product for mapping a graphical surface model, comprising a plurality of model values, onto a polygon of a perspective projection of a polygon-based, graphically-represented object defined by points within an object coordinate system, the program code including:

program code for performing the step (a) of subdividing the polygon into subpolygons each having a plurality of sides and a plurality of vertices, the subdivision being such that, given exact model values to be assigned to the vertices, the determination of model values by linear interpolation over the length of any one subpolygon side does not produce an interpolation error which exceeds a predetermined threshold value;

program code for performing the step (b) of determining the exact model values for the vertices of the subpolygons; and program code for performing the step (c) of determining the model values corresponding to the non-vertex object points by interpolation.

23. A computer program product according to claim 22 wherein the program code for performing step (a) comprises program code for subdividing the polygon such that a new vertex is created along a first side for which the maximum interpolation error exceeds the threshold value.

24. A computer program product according to claim 22 wherein the program code for performing step (a) further comprises program code for locating the new vertex substantially at the midpoint of the first side.

25. A computer program product according to claim 22 wherein the polygon is a triangle, and wherein the program code for performing step (a) further comprises program code for subdividing the triangle into four triangles such that a new vertex is created at the midpoint of each of the original triangle sides.

26. A computer program product for mapping a graphical surface model, comprising a plurality of model values, onto a triangle of a perspective projection of a triangle-based, graphically-represented object defined by points within an object coordinate system, the program code including:

program code for performing the step (a) of obtaining the exact model values for each vertex of the triangle;

program code for performing the step (b) of determining, for each side of the triangle, a maximum interpolation error which would result from the use of interpolation, based on the model values of the vertices at the endpoints of that side, to assign model values to object points along that triangle side;

program code for performing the step (c) of comparing the maximum error for each side to a predetermined threshold value;

program code for performing the step (d) of subdividing the triangle into subtriangles and repeating steps (a), (b), (c) and (d) for each subtriangle, if the maximum error for any of the triangle sides exceeds the threshold value; and program code for performing the step (e) of determining the model values corresponding to the non-vertex object points using interpolation.

27. A computer program product for mapping a graphical surface model, comprising a plurality of model values, onto a triangle of a perspective projection of a triangle-based, graphically-represented object defined by points within an object coordinate system, the triangle having a plurality of sides and a plurality of vertices, the program code including:

program code for performing the step (a) of creating new vertices along the triangle sides such that each of the triangle sides is divided into a plurality of sections, the length of each section being such that, given exact model values to be assigned to the vertices, the determination of model values by linear interpolation over the length of any one section does not produce an error which exceeds the threshold value;

program code for performing the step (b) of interconnecting the new vertices with line segments parallel to the original triangle sides, such as to create interior subtriangles having vertices at crossing points between the line segments;

program code for performing the step (c) of determining the exact model values for each of the vertices of the subtriangles; and program code for performing the step (d) of determining the model values corresponding to each non-vertex object point using linear interpolation.

28. A computer program product according to claim 27 further comprising program code for omitting steps (a)–(c) if, for each side of the triangle, no interpolation error which would result from the use of interpolation in assigning model values to object points along that side of the triangle would exceed the threshold value.

29. A computer program product for mapping a graphical surface model, comprising a plurality of model values, onto a w-isosceles triangle of a perspective projection of a triangle-based, graphically-represented object defined by points within an object coordinate system, the triangle having two sides and a base, the base being bounded by two vertices each having a homogeneous coordinate w of the same value, the program code including:

program code for performing step (a) of dividing the triangle into a plurality of trapezoids each having four vertices, two bases parallel to the base of the triangle, and two sides, each of which is colinear with one of the triangle sides, the length of the trapezoid sides being such that, given the exact model values to be assigned to the vertices of the trapezoid, the interpolation of model values along the sides of the trapezoid results in no interpolation error that exceeds a predetermined threshold value;

program code for performing step (b) of determining the exact model values for the vertices of each trapezoid;

program code for performing step (c) of subdividing the interior of each trapezoid into a plurality of w-isosceles subtriangles; and program code for performing step (d) of determining model values for the remaining object points of the triangle by interpolation.

30. A computer program product according to claim 29 further comprising program code for omitting steps (a)–(c) if, for each side of the triangle, no interpolation error which would result from the use of interpolation in assigning model values to object points along that side of the triangle would exceed the threshold value.

31. A computer program product according to claim 29 wherein the program code for performing step (c) further comprises program code for forming a plurality of geometrically isosceles subtriangles within each trapezoid.

32. A computer program product according to claim 29 further comprising program code for creating said w-isosceles triangle by dividing a triangle which is not w-isosceles into two w-isosceles triangles.

33. A computer apparatus comprising a storage medium in which is stored program code for mapping a graphical surface model, comprising a plurality of model values, onto a polygon of a perspective projection of a polygon-based, graphically-represented object defined by points within an object coordinate system, the storage medium comprising:

program code for performing the step (a) of subdividing the polygon into subpolygons each having a plurality of sides and a plurality of vertices, the subdivision being such that, given exact model values to be assigned to the vertices, the determination of model values by linear interpolation over the length of any one subpolygon side does not produce an interpolation error which exceeds a predetermined threshold value;

program code for performing the step (b) of determining the exact model values for the vertices of the subpolygons; and program code for performing the step (c) of determining the model values corresponding to the non-vertex object points by interpolation.

34. Apparatus according to claim 33 wherein the program code for performing step (a) comprises program code for subdividing the polygon such that a new vertex is created along a first side for which the maximum interpolation error exceeds the threshold value.

35. Apparatus according to claim 33 wherein the program code for performing step (a) further comprises program code for locating the new vertex substantially at the midpoint of the first side.

36. Apparatus according to claim 33 wherein the polygon is a triangle, and wherein the program code for performing step (a) further comprises program code for subdividing the triangle into four triangles such that a new vertex is created at the midpoint of each of the original triangle sides.

37. A computer apparatus comprising a storage medium in which is stored program code for mapping a graphical surface model, comprising a plurality of model values, onto a triangle of a perspective projection of a triangle-based, graphically-represented object defined by points within an object coordinate system, the storage medium comprising:

program code for performing the step (a) of obtaining the exact model values for each vertex of the triangle;

program code for performing the step (b) of determining, for each side of the triangle, a maximum interpolation error which would result from the use of interpolation, based on the model values of the vertices at the endpoints of that side, to assign model values to object points along that triangle side;

program code for performing the step (c) of comparing the maximum error for each side to a predetermined threshold value;

program code for performing the step (d) of subdividing the triangle into subtriangles and repeating steps (a), (b), (c) and (d) for each subtriangle, if the maximum error for any of the triangle sides exceeds the threshold value; and program code for performing the step (e) of determining the model values corresponding to the non-vertex object points using interpolation.

38. A computer apparatus comprising a storage medium in which is stored program code for mapping a graphical surface model, comprising a plurality of model values, onto a triangle of a perspective projection of a triangle-based, graphically-represented object defined by points within an object coordinate system, the triangle having a plurality of sides and a plurality of vertices, the storage medium comprising:

program code for performing the step (a) of creating new vertices along the triangle sides such that each of the triangle sides is divided into a plurality of sections, the length of each section being such that, given exact model values to be assigned to the vertices, the determination of model values by linear interpolation over the length of any one section does not produce an error which exceeds the threshold value;

program code for performing the step (b) of interconnecting the new vertices with line segments parallel to the original triangle sides, such as to create interior subtriangles having vertices at crossing points between the line segments;

program code for performing the step (c) of determining the exact model values for each of the vertices of the subtriangles; and program code for performing the step (d) of determining the model values corresponding to each non-vertex object point using linear interpolation.

39. Apparatus according to claim 38 wherein the storage medium further comprises program code for omitting steps (a)–(c) if, for each side of the triangle, no interpolation error which would result from the use of interpolation in assigning model values to object points along that side of the triangle would exceed the threshold value.

40. A computer apparatus comprising a storage medium in which is stored program code for mapping a graphical surface model, comprising a plurality of model values, onto a w-isosceles triangle of a perspective projection of a triangle-based, graphically-represented object defined by points within an object coordinate system, the triangle having two sides and a base, the base being bounded by two vertices each having a homogeneous coordinate w of the same value, the storage medium comprising:

program code for performing step (a) of dividing the triangle into a plurality of trapezoids each having four vertices, two bases parallel to the base of the triangle, and two sides, each of which is colinear with one of the triangle sides, the length of the trapezoid sides being such that, given the exact model values to be assigned to the vertices of the trapezoid, the interpolation of model values along the sides of the trapezoid results in no interpolation error that exceeds a predetermined threshold value;

program code for performing step (b) of determining the exact model values for the vertices of each trapezoid;

program code for performing step (c) of subdividing the interior of each trapezoid into a plurality of w-isosceles subtriangles; and program code for performing step (d) of determining the model values for the remaining object points of the triangle by interpolation.

41. Apparatus according to claim 40 wherein the storage medium further comprises program code for omitting steps (a)–(c) if, for each side of the triangle, no interpolation error which would result from the use of interpolation in assigning model values to object points along that side of the triangle would exceed the threshold value.

42. Apparatus according to claim 40 wherein the program code for performing step (c) further comprises program code for forming a plurality of geometrically isosceles subtriangles within each trapezoid.

43. Apparatus according to claim 40 wherein the storage medium further comprises program code for creating said w-isosceles triangle by dividing a triangle which is not w-isosceles into two w-isosceles triangles.

44. A video controller apparatus for exchanging graphics data between a host processor and a display that displays a graphical image to a user, the controller including a graphics processor in communication with a storage medium in which is stored program code for mapping a graphical surface model, comprising a plurality of model values, onto a polygon of a perspective projection of a polygon-based, graphically-represented object defined by points within an object coordinate system, the storage medium comprising:

program code for performing the step (a) of subdividing the polygon into subpolygons each having a plurality of sides and a plurality of vertices, the subdivision being such that, given exact model values to be assigned to the vertices, the determination of model values by linear interpolation over the length of any one subpolygon side does not produce an interpolation error which exceeds a predetermined threshold value;

program code for performing the step (b) of determining the exact model values for the vertices of the subpolygons; and program code for performing the step (c) of determining the model values corresponding to the non-vertex object points by interpolation.

45. A controller according to claim 44 wherein the program code for performing step (a) comprises program code for subdividing the polygon such that a new vertex is created along a first side for which the maximum interpolation error exceeds the threshold value.

46. A controller according to claim 44 wherein the program code for performing step (a) further comprises program code for locating the new vertex substantially at the midpoint of the first side.

47. A controller according to claim 44 wherein the polygon is a triangle, and wherein the program code for performing step (a) further comprises program code for subdividing the triangle into four triangles such that a new vertex is created at the midpoint of each of the original triangle sides.

48. A video controller for exchanging graphics data between a host processor and a display that display a graphical image to a user, the controller including a graphics processor in communication with a storage medium in which is stored program code for mapping a graphical surface model, comprising a plurality of model values, onto a triangle of a perspective projection of a triangle-based, graphically-represented object defined by points within an object coordinate system, the storage medium comprising:

program code for performing the step (a) of obtaining the exact model values for each vertex of the triangle;

program code for performing the step (b) of determining, for each side of the triangle, a maximum interpolation error which would result from the use of interpolation, based on the model values of the vertices at the endpoints of the corresponding side for which the maximum interpolation error is determined, to assign model values to object points along the corresponding side;

program code for performing the step (c) of comparing the maximum error for each side to a predetermined threshold value;

program code for performing the step (d) of subdividing the triangle into substriangles and repeating steps (a), (b), (c) and (d) for each subtriangle, if the maximum error for any of the triangle sides exceeds the threshold value; and program code for performing the step (e) of determining the model values corresponding to the non-vertex object points using interpolation.

49. A video controller for exchanging graphics data between a host processor and a display that displays a graphical image to a user, the controller including a graphics processor in communication with a storage medium in which is stored program code for mapping a graphical surface model, comprising a plurality of model values, onto a triangle of a perspective projection of a triangle-based, graphically-represented object defined by points within an object coordinate system, the triangle having a plurality of sides and a plurality of vertices, the storage medium comprising:

program code for performing the step (a) of creating new vertices along the triangle sides such that each of the triangle sides is divided into a plurality of sections, the length of each section being such that, given exact model values to be assigned to the vertices, the determination of model values by linear interpolation over the length of any one section does not produce an error which exceeds the threshold value;

program code for performing the step (b) of interconnecting the new vertices with line segments parallel to the original triangle sides, such as to create interior subtriangles having vertices at crossing points between the line segments;

program code for performing the step (c) of determining the exact model values for each of the vertices of the subtriangles; and program code for performing the step (d) of determining the model values corresponding to each non-vertex object point using linear interpolation.

50. A controller according to claim 49 wherein the storage medium further comprises program code for omitting steps (a)–(c) if, for each side of the triangle, no interpolation error which would result from the use of interpolation in assigning model values to object points along that side of the triangle would exceed the threshold value.

51. A video controller for exchanging graphics data between a host processor and a display that displays a graphical image to a user, the controller including a graphics processor in communication with a storage medium in which is stored program code for mapping a graphical surface model, comprising a plurality of model values, onto a w-isosceles triangle of a perspective projection of a triangle-based, graphically-represented object defined by points within an object coordinate system, the triangle having two sides and a base, the base being bounded by two vertices each having a homogeneous coordinate w of the same value, the storage medium comprising:

program code for performing step (a) of dividing the triangle into a plurality of trapezoids each having four vertices, two bases parallel to the base of the triangle, and two sides, each of which is colinear with one of the triangle sides, the length of the trapezoid sides being such that, given the exact model values to be assigned to the vertices of the trapezoid, the interpolation of model values along the sides of the trapezoid results in no interpolation error that exceeds a predetermined threshold value;

program code for performing step (b) of determining the exact model values for the vertices of each trapezoid;

program code for performing step (c) of subdividing the interior of each trapezoid into a plurality of w-isosceles subtriangles; and program code for performing step (d) of determining the model values for the remaining object points of the triangle by interpolation.

52. A controller according to claim 51 wherein the storage medium further comprises program code for omitting steps (a)–(c) if, for each side of the triangle, no interpolation error which would result from the use of interpolation in assigning model values to object points along that side of the triangle would exceed the threshold value.

53. A controller according to claim 51 wherein the program code for performing step (c) further comprises program code for forming a plurality of geometrically isosceles subtriangles within each trapezoid.

54. A controller according to claim 52 wherein the storage medium further comprises program code for creating said w-isosceles triangle by dividing a triangle which is not w-isosceles into two w-isosceles triangles.

* * * * *

UNITED STATES PATENT AND TRADEMARK OFFICE
CERTIFICATE OF CORRECTION

PATENT NO.    : 5,905,500
DATED         : May 18, 1999
INVENTOR(S)   : Yakov Kamen, et al.

It is certified that an error appears in the above identified patent and that said Letters Patent is hereby corrected as shown below:

Column 20, line 50, change "substriangles" to --subtriangles--.

Signed and Sealed this

Thirtieth Day of November, 1999

Attest:

Q. TODD DICKINSON

*Attesting Officer*     *Acting Commissioner of Patents and Trademarks*